INTERCOMMUNICATION TELEPHONE SYSTEM

Filed Jan. 7, 1950 2 SHEETS—SHEET 1

SENIOR MASTER STATION

INVENTOR
HARRY GEORGE WALL
BY Paul Kolisch
ATTORNEY

INTERCOMMUNICATION TELEPHONE SYSTEM

Filed Jan. 7, 1950 2 SHEETS—SHEET 2

JUNIOR MASTER STATION

INVENTOR
HARRY GEORGE WALL
BY Paul Kolisch
ATTORNEY

Patented Feb. 17, 1953

2,629,022

UNITED STATES PATENT OFFICE 2,629,022

INTERCOMMUNICATION TELEPHONE SYSTEM

Harry G. Wall, London, England, assignor to Modern Telephone Corporation, New York, N. Y., a corporation of New York Application January 7, 1950, Serial No. 137,307

11 Claims. (Cl. 179—37)

Figure 1:
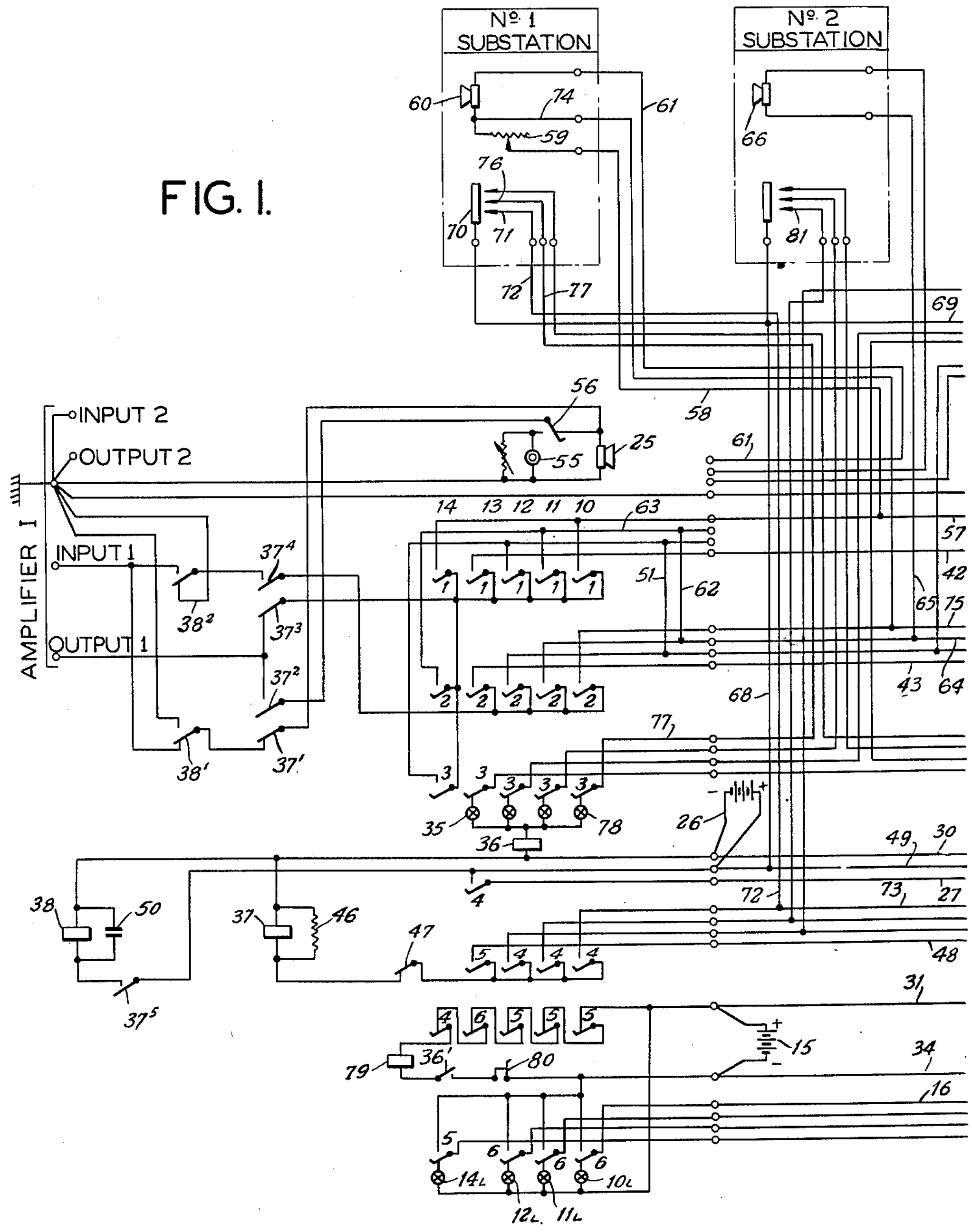

This invention has to do with intercommunication telephone systems comprising a senior amplified master station, a junior amplified master station and a plurality of substations.

The two master stations have essentially the same equipment which includes in addition to an amplifier, permanent magnet loudspeakers, also to be utilized as self-energizing microphone, telephone receivers, buzzers, selector keys, signal lights and lamps. The junior master station has a combination control and talk-listen key. The senior master does not have a talk-listen key, but does have an over-riding control key which it can use to interrupt speech from any station.

The substations each have a loudspeaker, a talk-listen key and selector keys for signaling each of the master stations.

A master station calls a substation by depressing the appropriate selector switch and then voice calling. To answer, the substation depresses its talk-listen switch. If the senior master wishes to call the junior master the appropriate selector key is depressed, whereupon a signal lamp lights and a buzzer sounds at the junior station.

A junior master station calls the other stations in the same manner as the senior.

Whenever a master station is talking with a substation a signal light is lit at the other master station to inform it that the substantion is busy.

It is not possible for a master station secretly to listen in on a conversation between two other stations because as soon as the master station depresses a station selector key, it puts itself in "talk" position and can only be switched to "listen" position by the operation of the talk-listen switch at the called station.

A master station can receive and transmit speech over its loudspeaker or receive over its telephone receiver and transmitter over its loudspeaker.

Each master station has a paging key for connecting it to all substations and a signal light is lit at the other master station showing the stations being paged.

The connection of the loudspeakers at the different stations to the input and output and vice versa of the amplifiers is carried out over series connected contacts of two talk-listen relays. The loudspeakers may be grounded for a fraction of a second between the operation of the two relays to dissipate any noise making currents.

These and other features of the invention will more clearly appear from the following description and the appended claims. In the drawings Fig. 1 is a circuit diagram of a senior master station and two substations, and Fig. 2 is a circuit diagram of a junior master station and one substation.

Figure 2:
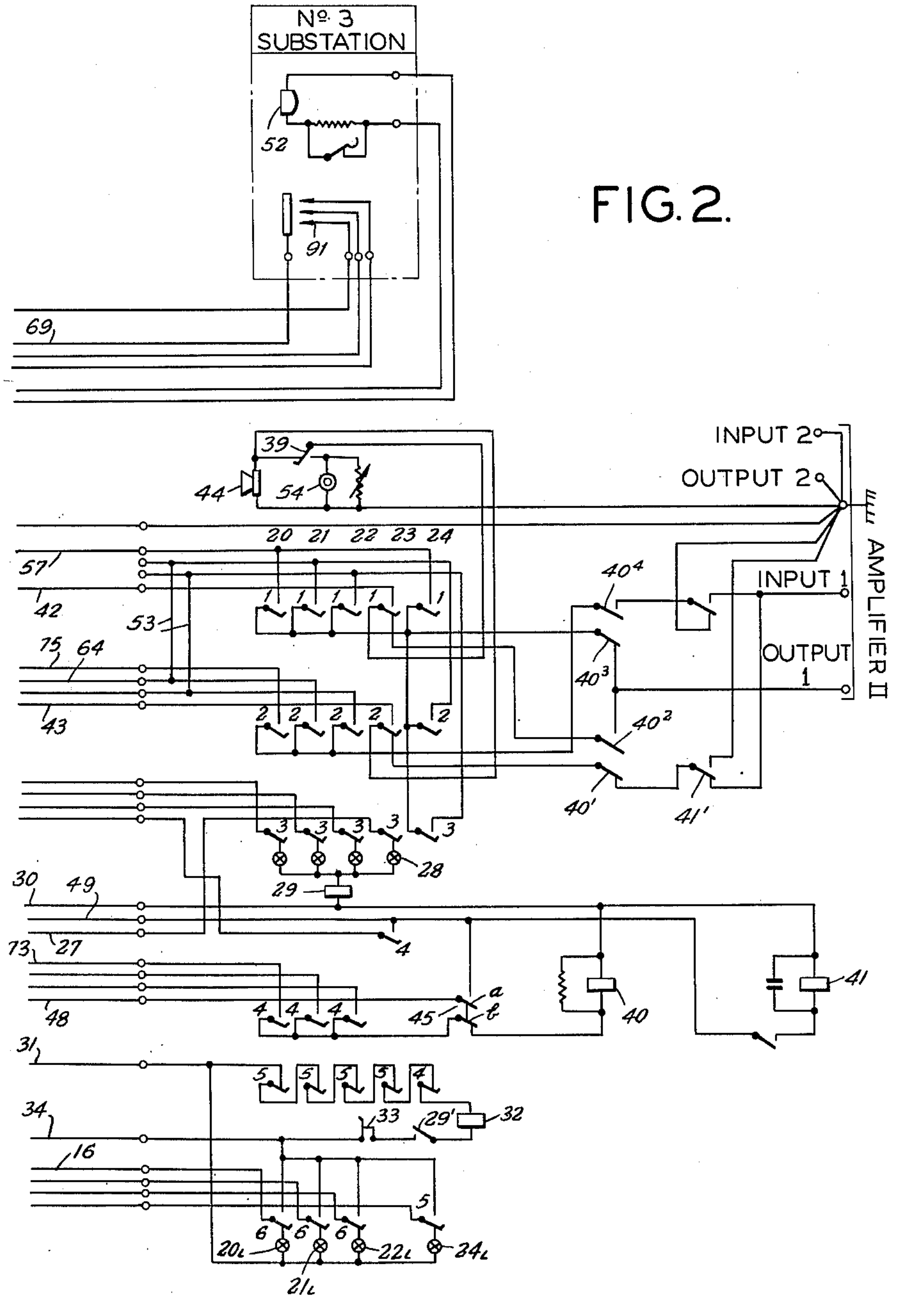

The drawings should be aligned with Fig. 1 to the left of Fig. 2.

*Busy signal circuit*

If a selector key 10 at the senior master station is depressed a circuit will be closed as follows:

Negative pole battery 15, make contact and sixth blade of key 10, conductor 16, and at the junior master the sixth blade and break contact of key 20, light 20$_1$, and positive pole battery 15. Light 20$_1$ at the junior master station is lit to indicate that the senior station is connected to the No. 1 substation. An equivalent circuit would also be closed if key 20 at the junior master station were depressed to call the senior station and light 10$_1$ at the master station lit. If paging keys 14 or 24 are depressed a similar circuit is closed over the appropriate fifth blades, make contacts and busy lights of the respective selector keys. Busy lights 10$_1$—14$_1$ and 20$_1$—24$_1$ serve as indications between master stations of the status of the substations.

*Master to master signaling circuits*

If a selector key 13 at the senior master station is depressed a circuit for the called junior master station calling signal lamp is completed as follows:

Positive pole of battery 26, fourth blade and make contact of key 13, conductor 27, and at the junior master station the third blade and break contact of key 23, signal lamp 28, the winding of relay 29, conductor 30 to the negative pole of battery 26. Signal lamp 28 lights and relay 29 operates to close its contact 29' to complete the following circuit:

Positive pole of battery 15, conductor 31, break contacts and fifth blades of keys 20, 21, 22 and 23, break contact and fourth blade of key 24, the winding of buzzer 32, make contact 29', hand-operated key 33, conductor 34 to the negative pole of battery 15. This actuates the buzzer at the junior master station. If the key 23 at the junior master is depressed to signal to the senior master station, circuits as described above are closed, in reverse, thus causing lamp 35, relay 36 and buzzer 79 to be energized at the senior master station. In this manner there is visual and sound signaling between master stations.

*Master to master talking circuits*

As described above, selector keys 13 or 23 are depressed at either master station to signal the other. To reply to such a call, a master station depresses its corresponding key 13 or 23, i. e., the senior master station calls and replies over key 13 and junior master station over key 23. Loudspeaker 25 of the senior master is connected via the relay armature 37′ and break contact of talk-listen relay 37, armature 38′ and break contact of talk-listen relay 38 to the input of the amplifier. The other connection from loudspeaker 25 is grounded. Junior master station loudspeaker 44 is, on one side, connected to ground. The other side over one branch is normally connected via the break contact of its receiver key 39, the first blade and break contact of the key 23 to armature $40^2$ and make contact of talk-listen relay 40. The other branch from the loudspeaker is normally connected via the second blade of key 23, armature 40′ and break contact of talk-listen relay 40, armature 41′ and break contact of talk-listen relay 41 to the input of the junior master amplifier. However, the depressing of key 23 has switched one lead from loudspeaker 44 via the break contact of receiver key 39, the first blade and make contacts of the key 23, conductor 42 and at the senior master station, the make contact and first blade of the key 13, armature $37^3$ and break contact to the output of the senior master amplifier. The depressing of the key 23 at the junior master station has also switched the other loudspeaker lead via the second blade and make contact of key 23, the conductor 43, and at the senior master station the make contact and second blade of key 13, to armature $37^4$ and make contact of relay 37.

The talking circuit from the senior master to the junior master is now complete.

To enable speech to be transmitted from the junior master station to the senior master station, talk-listen relays 37 and 38 at the senior master must be operated. The circuit for the relay 37 is closed, by depressing a combination control key and talk-listen switch 45 which has two blades *a* and *b*, as follows:

Negative pole of battery 26, relay 37 and 150 ohm resistor 46 in parallel (at the senior master), break contact and key 47, the fifth blade and make contact of key 13, conductor 48 and at the junior master station the first blade *a* and make contact of key 45, conductor 49 to the positive pole of battery 26. Relay 37 now operates.

Armature 37′ opens to disconnect senior master loudspeaker 25 from the input of the amplifier and armature $37^2$ connects the loudspeaker to the output of the amplifier. Armature $37^3$ disconnects the junior master station loudspeaker 44 from the output of the amplifier and armature $37^4$ connects the junior master station loudspeaker to ground, as previously described. Thus, both sides of the junior master station loudspeaker are, at this point, grounded. Armature $37^5$ and make contact relay 37 close a circuit for relay 38 as follows:

Positive pole battery 26, armature $37^5$ and make contact winding of relay 38 to negative pole of battery 26. Relay 38 operates.

When relay 38 operates, the junior master loudspeaker is disconnected from ground at the break contact and armature $38^2$ and connected via the make contact and armature to the input of the amplifier.

Armature $37^2$ and make contact connect senior master station loudspeaker 25 to the output of the senior amplifier to complete the talking circuit from the junior master station to the senior master station.

The following is a short discussion of the reasons for using two talk-listen relays 37, 38 or 40, 41 when switching the master station or substation loudspeaker from input to output and vice versa.

On the type of talk-listen equipment in common use, the master station is equipped with a talk-listen key and the switching to input and output is carried out at the contacts of this key. In the system according to the present invention, the contacts which switch the input and output are mounted as a relay. This relay is operated by a talk-listen key. The make and break of the contacts mounted on a relay are far quicker than the operation of contacts operated by a key. Thus, the input and output switching is carried out far quicker with a relay.

By way of example, the operation will be discussed with relation to the loudspeaker at the senior master station and at the No. 1 substation. Assuming that loudspeaker 25 is connected to the input of its amplifier and a substation loudspeaker 60 is connected to the output of the amplifier, the coil of loudspeaker 60 is vibrating to create sound. During the milli-second following operation of the switching relay, loudspeaker 60 is disconnected from output and connected to input where it will now act as a moving coil loudspeaker, loudspeaker 25 now being connected to output. The switching of loudspeaker 60 from output to input takes place so quickly that its core is still in motion. The movement of the core will generate a current which will flow to the amplifier input, be amplified and fed to loudspeaker 25 which is now across the output. This vibration of the cone of loudspeaker 60 is great by comparison with the vibration caused by sound waves impinging on it due to the fact that it was caused by the power emanating from the output of the amplifier and is heard over loudspeaker 25 as an extremely loud "plop."

If loudspeaker 60 is now switched back to output and loudspeaker 25 to input the same trouble arises in reverse.

It became necessary, therefore, to arrange the circuit so that a loudspeaker switched from output was not immediately switched to input and give time for the distension or vibration of the loudspeaker cone to stop. It was also found possible to dissipate some of the current created by the movement of the coil by short-circuiting, i. e. connecting to ground, a loudspeaker during the period when the loudspeaker was disconnected from output, but not yet connected to input. It is believed that the grounding of the loudspeaker is not necessary in view of the time lag caused by the use of two relays, but it has been included in the circuit.

First, talk-listen relay 37 is energized over a circuit controlled by the talk-listen key 45 at the junior master station. The second talk-listen relay 38 is operated over a contact $37^5$ of the first talk-listen relay and is relatively slow in energizing because it is operating against the pressure of its contacts. The short interval in time, between operation of the first and second talk-listen relays, is sufficient to dissipate the noise making currents. Because the second talk-listen relay 38 will release quicker than it energizes, due to the fact that it is releasing under pressure from its contacts rather than against this pressure, a switching time lag is provided by a 100 mfd. condenser 50 shown in parallel with relay 38 which slows down the release of the relay.

Any excess voltages appearing in the circuits for the talk/listen relays, mainly caused by switching these inductances, are likely to induce voltages into the speaking circuits, which voltages, after amplification, become audible. The parallel condenser 50, and also the shunt resistor 46, will absorb or dissipate most of the excess voltages created when operating relays 38 and 37 and help reduce the noise making effect of these extraneous sources.

*Senior masters over-riding control circuit (to junior master)*

Relays 37 and 38 may be operated by depressing key 45 at the junior master, over a circuit previously described, to put the junior master in talking condition with the senior master. If the senior master wishes to talk rather than listen, he may interrupt the junior by opening a non-locking control key 47 to break the circuit of relay 37. The opening of armature $37^5$ releases relay 38 and the senior master station is now connected to the input of the amplifier and the junior master to the output of the amplifier in spite of the fact that the junior master talk-listen key 45 is or may be still depressed (loudspeaker 25, armatures 37' and 38' and break contacts, input 1; output 1, armature $37^3$ and break contact, first blade and make contact key 13, conductor 42, first blade and make contact key 23, key 39, loudspeaker 44).

*Master station telephone receivers*

Each master station has a telephone receiver 54 and 55. If telephone receiver 55 at the senior master station is removed from its rest position, receiver key 56 is changed over. If the master station is, at the moment, connected to the output of the amplifier its loudspeaker will no longer be connected to the output, but is switched out in favor of the receiver as follows: Output terminal at the amplifier, make contact and armature $37^2$, receiver key 56 and make contact to receiver 55.

When, however, the master station is connected to the input in spite of the fact that receiver key has been operated, loudspeaker 25 is still in circuit to the input as follows: Input terminal 1, break contact and armature 38', break contact and armature 37' to loudspeaker 25. Thus, a master station may receive and transmit speech via the loudspeaker or alternatively receive speech in the receiver and transmit speech via the loudspeaker.

*Master station calling substation*

If at the senior master station key 10 is depressed, substation No. 1 will be connected to the output of amplifier I as follows:

Output terminal of the amplifier, break contact and armature $37^3$, first blade and make contact of key 10, conductor 57, conductor 58, volume control potentiometer 59, loudspeaker 60, conductor 61 to ground at amplifier I.

With master loudspeaker normally put to the amplifier input, as explained, this completes the talking circuit from the senior master station to substation No. 1.

If no volume control 59 is provided at the substation (as shown at substation No. 2) the circuit is completed from the first blade and make contact key 11, strap 62 from conductor 63 to conductor 64, conductor 65 to loudspeaker 66. Strap 51 serves to connect loudspeaker 52 of substation No. 3 to amplifier I in a similar manner. Straps 53 at the junior master connect this station to the substations in the same manner as straps 51, 62 connect the senior master to the substations.

A substation, upon receipt of the voice call operates its talk-listen switch 71, 81 or 91 and closes a circuit which is for substation No. 1 as follows:

Positive pole battery 26, conductor 49, conductor 68, conductor 69, bus bar 70, talk-listen switch 71, conductor 72, conductor 73, the make contact and fourth blade of key 10, the break contact and key 47, the winding of relay 37 to negative pole battery 26. Relay 37 operates. The switching of the contacts of relays 37 and 38 takes place as described above and the substation loudspeaker 60 is connected to the input via conductors 74, 75, the make contact and second blade of key 10, armatures $37^4$ and $38^2$ and make contacts, input 1. The senior master station's loudspeaker 25 is connected to output 1 as before. This completes the talking circuit from the substation to the senior master station.

If the senior master station control key 47 is opened, the circuit of relay 37 is broken and relays 37 and 38 release to put the senior master station in the talking position.

*Substation calling the senior master station*

If a signal key 76 at substation No. 1 is depressed, a circuit is closed as follows:

Positive pole of battery 26, conductors 49, 68, 69, bus bar 70, key 76, conductor 77, and at the master station the third blade and break contact of the key 10, a signal lamp 78, the winding of relay 36 to negative pole of battery 26.

Signal lamp 78 lights and relay 36 operates. The contacts of relay 36 close a circuit for buzzer 79 (negative battery 15, key 80, make contact and armature 36', buzzer 79, blades and break contacts of keys 14—10 to positive pole battery 15).

Upon receipt of this call at the master station selector key 10 is depressed and conversation may proceed as previously described.

*Junior master station*

Communication between the junior master station and a substation is carried out exactly as described for the senior master station except that loudspeaker 44 and/or telephone receiver 54 are connected to contacts $40^2$ and $40^1$ of relay 40, respectively, via the first blade and break contact and second blade and break contact of key 23.

*Substation talk-listen key*

It should be noted that it is possible to provide each substation with only one talk-listen key 71, 81 or 91 for use to both master stations because, while this talk-listen key is common to both master stations, via, in the case of substation No. 1, conductor 72, fourth blade of appropriate key, windings of talk-listen relays (37, 38 or 40, 41), either master station is connected in circuit only when the appropriate selector key is depressed at the master station.

*Paging*

If paging keys 14 or 24 at either master station are depressed, all substation loudspeakers will be multiplied to the first, second and third blades of the paging keys and to the output of the amplifier. The master station loudspeakers are already connected to the input of the amplifiers so that paging can proceed.

What is claimed is:

1. In an intercommunicating telephone system, at least one master station, at least one substation, at each of the stations a loudspeaker, an amplifier having input and output terminals, a first talk-listen relay for each master station, a second talk-listen relay for each master station, a circuit therefor, means including a make contact of the first relay for controlling said circuit, a switchable connection between the loudspeakers and the input and output terminals of the amplifier, and contacts of said first and second relays operable to switch the connection of the loudspeaker at a master station from the input to the output of the amplifier and vice versa.

2. In an intercommunicating telephone system, at least one master station, a plurality of substations, a loudspeaker and selector keys at each of the stations, an amplifier at the master station having input and output terminals, a talk-listen key at each of the substations, a first talk-listen relay for the master station, a second talk-listen relay for the master station operating in series with the first relay, a first circuit including contacts of said first and second relays connecting the loudspeaker at the master station to the input of the amplifier, a second circuit including a contact of the first relay and one of the selector keys at the master station to connect the output of the amplifier to the loudspeaker of the selected called station, a third circuit closed by the operation of the talk-listen key at a substation for energizing said first talk-listen relay whereby the called master station loudspeaker is switched to the output of the amplifier and the calling substation loudspeaker to the input of the amplifier.

3. In an intercommunicating telephone system, a senior master station, a junior master station, a plurality of substations, at each of said stations a loudspeaker and selector keys; at each of the master stations an amplifier having input and output terminals, a talk-listen key at the junior master station and each of the substations, a first talk-listen relay for each master station, a second talk-listen relay for each master station, a circuit therefor, means including a make contact of the first relay for controlling said circuit, means including break contacts of said first and second relays connecting the loudspeaker at the associated master station to the input of its amplifier, a circuit including a break contact of the first relay and one of the selector keys at a master station to connect the output of the amplifier to the loudspeaker of the selected called station, and a circuit closed by the operation of the talk-listen key at a substation or junior master station for energizing said first talk-listen relay to energize both talk-listen relays and switch the called master station loudspeaker to the output of the amplifier and the calling substation or other station loudspeaker to the input of the amplifier.

4. The system according to claim 3 and in which after operation of the first talk-listen relay but before operation of the second talk-listen relay, ground is connected to a loudspeaker, which is being switched from the amplifier output to the input or vice versa.

5. The system according to claim 3, said selector keys at the master station including a key for each substation, a signal light associated with each of said selector keys at both master stations, and a circuit for each of said lights including the corresponding key at the other master station, whereby when the selector key for a given substation is closed at one master station a light will be lit at the other master station informing it that the substation is busy.

6. The system according to claim 3 and a signal lamp at each master station associated with the selector key for the other master station, a circuit for each of said lamps including the corresponding key at the other master station, and a buzzer at each of the master stations included in said circuit, whereby when one master station calls another a lamp is lit and a buzzer sounded at the called station.

7. The system according to claim 3, a telephone receiver, a key, means for controlling said key, said means including the receiver at each master station for disconnecting the loudspeaker from the output of the associated amplifier, a circuit including said key and a make contact of the first talk-listen relay for connecting the receiver to the output of the associated amplifier, whereby at a master station speech may be received over the receiver and transmitted over the loudspeaker.

8. In an intercommunicating telephone system, a senior master station, a junior master station, a plurality of substations, at each of said stations a loudspeaker and selector keys; at each of the master stations an amplifier having input and output terminals, a talk-listen key at each of the substations, a first talk-listen relay for each master station, a second talk-listen relay for each master station, a circuit therefor, means including a make contact of the first relay for controlling said circuit, means including break contacts of said first and second relays connecting the loudspeaker at the associated master station to the input of its amplifier, a circuit including a break contact of the first relay and one of the selector keys at a master station to connect the output of the amplifier to the loudspeaker of the selected called station, a circuit closed by the operation of the talk-listen key at a substation or junior master station for energizing said first talk-listen relay to energize both talk-listen relays and switch the called master station loudspeaker to the output of the amplifier and the calling substation or other station loudspeaker to the input of the amplifier, a connection to ground for the loudspeaker at a master station which is being switched from the output to the input terminal of the amplifier, including a break contact of the first and a make contact of the second talk-listen relay, and a connection to ground for the loudspeaker of a substation which is being switched from the output to the input terminal of the amplifier, including a make contact of the first and a break contact of the second talk-listen relay.

9. In an intercommunicating telephone system, a senior master station, a junior master station, a plurality of substations, at each of said stations a loudspeaker and selector keys; at each of the master stations an amplifier having input and output terminals, a control key at the senior master station, a combination control key and talk-listen key at the junior master station, a talk-listen key at each of the substations; a first talk-listen relay for each master station, a second talk-listen relay for each master station, a circuit therefor, means including a make contact of the first relay for controlling said circuit, means including break contacts of said first and second relays connecting the loudspeaker at the associated master station to the input of its amplifier, a circuit including a break contact of the first relay and one of the selector keys at a master station to connect the output of the amplifier to the loudspeaker of the selected called station, a circuit closed by the operation of the talk-listen key at a substation or the junior master station for energizing said first talk-listen relay to energize both talk-listen relays and switch the called master station loudspeaker to the output of the amplifier and the calling substation or other station loudspeaker to the input of the amplifier, the control key at the senior master station having contacts in the circuit of the associated first talk-listen relay, whereby the senior master station may disconnect the substation or junior master station from the input terminal of the amplifier, the combination control and talk-listen key at the junior master station having contacts in the circuit of the associated first talk-listen relay whereby the junior master station may disconnect the substation from the input terminal of the amplifier, a connection to ground for the loudspeaker at a master station which is being switched from the output to the input terminal of the amplifier, including a break contact of the first and a make contact of the second talk-listen relay, and a connection to ground for the loudspeaker of a substation which is being switched from the output to the input terminal of the amplifier, including a make contact of the first and a break contact of the second talk-listen relay.

10. The system according to claim 2, and in which a fourth circuit is provided to connect the input of the amplifier to the loudspeaker of the selected called station when said third circuit is completed, said fourth circuit having means including a selector key at the master station and contacts of said first and second relays, and detachable strappings at the master station between said second and fourth circuits to permit communication to certain substations in one direction only.

11. The system according to claim 3, and in which the selector key at a junior master station for calling a senior master station includes a break contact to disconnect the amplifier associated with a junior master when selecting a senior master.

HARRY G. WALL.

REFERENCES CITED

The following references are of record in the file of this patent:

UNITED STATES PATENTS

| Number | Name | Date |
|---|---|---|
| 1,272,641 | Egerton | July 16, 1918 |
| 2,326,616 | Campbell | Aug. 10, 1943 |
| 2,500,141 | Torn | Mar. 7, 1950 |